May 5, 1931.  E. HERRMANN  1,804,055
EPICYCLIC GEAR
Filed July 28, 1930

Inventor:
Emil Herrmann
by [signature]
Attorney

Patented May 5, 1931

1,804,055

UNITED STATES PATENT OFFICE

EMIL HERRMANN, OF MULHEIM-RUHR, GERMANY, ASSIGNOR TO PAUL PIEPENSTOCK, OF MUHLHEIM-RUHR, GERMANY

EPICYCLIC GEAR

Application filed July 23, 1930, Serial No. 471,145, and in Germany January 12, 1929.

This invention relates to an epicyclic gear, in which the pinions and their carrier formed as a casing can be braked.

The novelty consists in that the carrier of the pinion is non-rotatably but shiftably connected with a disc arranged loosely rotatable on one of the central driving wheel shafts, which disc can be pressed against brake discs, mounted on the outer side of the carrier on the pinion shafts.

According to the invention, the shafts of the pinions, forming the star wheels, are arranged shiftable axially to a limited extent and friction discs on their ends at both sides of their carrier in such a manner that the discs on the one side are caused to bear on a common brake disc, rotatably mounted on one of the toothed wheel shafts and axially shiftable, and the discs of the other side, owing to the axial displacement caused by the brake disc, are brought into contact with plane surfaces arranged on the carrier of the pinions.

Two embodiments of the invention are illustrated by way of example in the accompanying drawing in which.

The power transmission from the engine shaft 1 to the coaxially arranged driving shaft 2 for the vehicle wheels is effected by means of an epicyclic gear and a casing 3 carrying the pinions, which casing can be braked more or less strongly, as also the pinions, and thereby can influence the shaft 2 to a varying extent.

Figure 1:
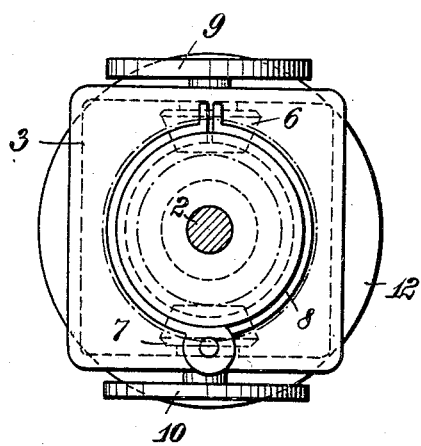
Fig. 1 shows the gear with the bevel pinions in rear elevation.
Figure 2:
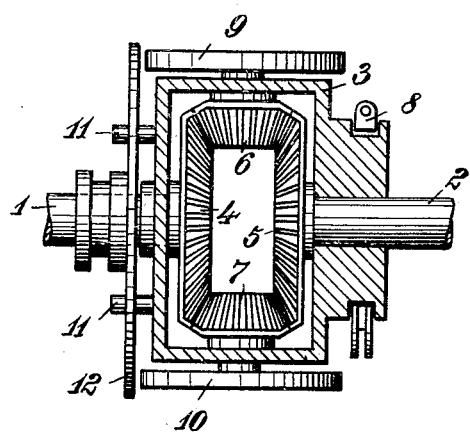
Fig. 2 is a cross section through the gear.

According to Figs. 1 and 2 the diametrically opposite ends of the driving shaft 1 and driven shaft 2 project into the casing 3 and each carry a bevel wheel 4 and 5 respectively, which mesh permanently with pinions 6 and 7 mounted in the casing 3. The gear casing 3 is rotatable around the central wheel shafts 1, 2 and can be locked by a cheek brake 8 or the like, operatable from the driver's seat. The pinion shafts each carry a brake disc 9 and 10 on the outer side of the casing 3, against which discs a common brake disc 12, loosely mounted on one of the central wheel shafts and axially displaceable on catch pins 11 of the casing 3 of the pinions 6, 7, can be pressed also from the driver's seat.

When the brakes are disengaged, the casing 3 runs idle, that is, it is rotated idly by the pinions 6, 7 which roll on the stationary central wheel 5 of the driven shaft 3, when the engine shaft 2 is rotating. If the cheek brake 8 is applied, the casing 3 is locked, so that the pinions rotate only around their own axis and therefore rotate the central wheel 5 in the opposite direction to that of the engine shaft.

In order to obtain forward speeds, the cheek brake 8 is again disengaged and the pinion wheel brake 9, 10, 12 applied. The casing of the pinions 6, 7 then rotates more or less quickly around the central wheel shafts, according to the braking pressure exerted on the pinions, that is the less high the braking pressure which is exerted on the pinions is, the quicker will the casing of the pinions rotate around the central wheel 5, at the same time slowing down the speed of the driven shaft 2, and the stronger the braking pressure is, the slower will the casing of the pinions rotate and thereby increase the speed of rotation of the driven shaft. Thus the maximum rotation speed of the pinions 6, 7 is attained when the brake is disengaged, whereas the maximum speed of rotation of the driven shaft is obtained, when the pinions are stationary relative to their casing. In this instance the transmission ratio is 1:1. In the first instance the vehicle will be driven forward at the first or smallest speed, and in the latter instance in the direct or highest speed. Between the first and last speed any desired transmission up to the ratio of 1:1 can be obtained by simply applying or releasing the brake.

If, when travelling with the pinion wheel brake 9, 10, 12 applied, that is with a ratio of transmission of 1:1, the cheek brake 8 be also engaged and then the pinion brake disengaged, the gear rotates the vehicle wheels in the opposite direction and thereby brakes the vehicle. The braking effect may be accentuated by giving more gas. The gear does not rotate the vehicle wheels positively but yieldingly, so that, when travelling forward, they can again rotate in forward direction.

Figure 3:
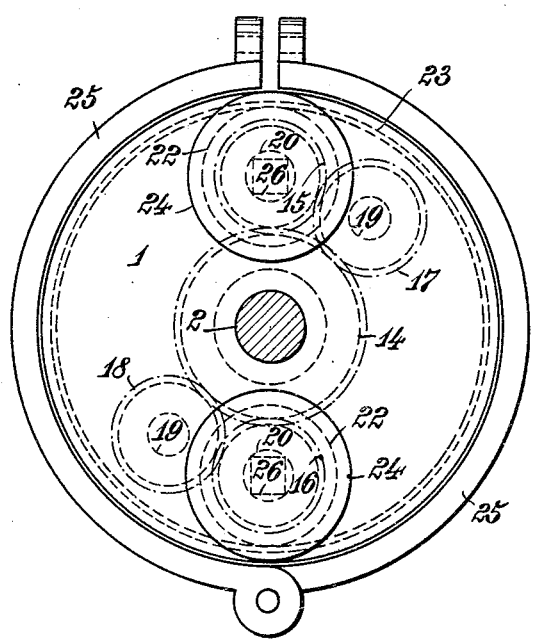
Fig. 3 shows the gear with spur pinions in rear elevation.
Figure 4:
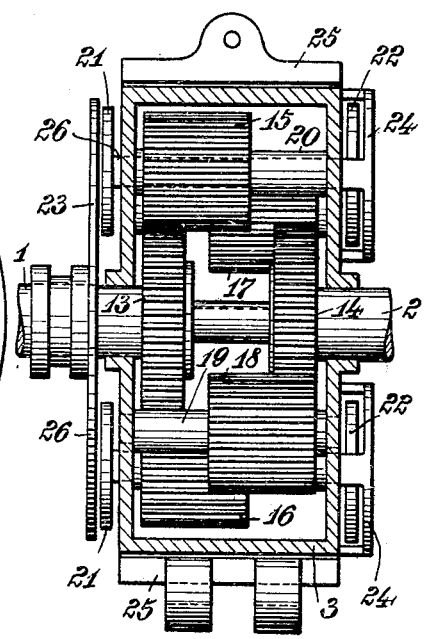
Fig. 4 is a cross section of Fig. 3.

According to Figs. 3 and 4 spur wheels 13 and 14 are arranged, one on the end of each of the shafts 1 and 2 respectively, projecting into the casing 3. These spur wheels engage permanently with the diametrically opposite pinions 15, 16 and at the same time with the pinions 17 and 18, meshing with the pinions 15, 16 so that two interconnected epicyclic gears 13, 15, 16 and 14, 17, 18 are formed. Whereas the pinions 17, 18 are keyed on shafts 19, shiftably journaled in the casing 3, the pinions 15, 16 are keyed on square shafts 26, which are shiftable in shafts 20, journaled in the casing 3 and carry at each end a flat disc 21, 22 respectively outside the casing 3. A brake disc 23 shiftable and rotatable on the engine shaft 1 and adapted to be operated from the driver's seat, can be pressed against the flat disc 21 on the one side, which brake disc 23 presses at the same time the flat disc 22 of the other side against the surface 24, arranged stationary on the rear side of the casing 23 by the axial displacement of the shaft 20. The casing 3 is cylindrical and forms a brake drum, around which a cheek brake 25 is arranged, which is also operatable from the driver's seat.

In the direct speed the pinions 15, 16, 17 and 18 are braked and locked, and consequently the driving shaft 2 and the casing of the pinions is rotated by the engine shaft 1 in the same direction and at the same speed. By gradually disengaging the pinion brake, so that the surfaces slide one on the other, the speed of rotation of the driving shaft 2 is reduced and therefore the rotation of the pinions 15, 16, 17, 18 around their own axis is caused and their speed of rotation gradually increased. When the brake is entirely disengaged, the casing rotates idly in the same direction as the engine shaft 1. In the reverse speed only the cheek brake 25 acts, through which the casing 3 can be stopped independently of the pinion brake. When the casing is stopped in this manner, the rotation of the driving shaft 2 is effected by the rotating pinions 15, 16, 17 and 18 which transmit the rotary movement of the engine shaft to the driving shaft in the opposite direction.

To each of the two epicyclic gears 13, 15, 16 and 14, 17, 18 further pinions may be added and consequently also discs, according to the size of the pinion casing 3.

The two forms of construction of the epicyclic gear, above described, may be used generally as elastic power transmission means and consequently serve also as an elastic clutch for machine tools and other machines and as a brake for motor vehicles.

I claim:—

An epicyclic gear especially for motor vehicles, comprising in combination a carrier having flat surfaces, spur pinions in said carrier, shafts for said spur pinions, shiftable axially limited flat discs on the ends of said shaft on both sides of said carrier, a brake disc rotatably mounted and axially shiftable on one of said shafts the flat discs on one side of said carrier adapted to be brought into contact with said brake and the flat discs on the other side of said carrier adapted to engage with the surfaces on said carrier through the axial displacement caused by said brake disc.

In testimony whereof I affix my signature.

EMIL HERRMANN.